US005945946A

United States Patent [19]

Munger

[11] Patent Number: 5,945,946

[45] Date of Patent: Aug. 31, 1999

[54] SCANNING ARRAY ANTENNA USING ROTATING PLATES AND METHOD OF OPERATION THEREFOR

[75] Inventor: Archer David Munger, Mesa, Ariz.

[73] Assignee: Motorola, Inc., Schaumburg, Ill.

[21] Appl. No.: 08/943,707

[22] Filed: Oct. 3, 1997

[51] Int. Cl.[6] .......... H04B 7/00

[52] U.S. Cl. .......... 342/367; 342/376; 343/754

[58] Field of Search .......... 342/376, 354, 342/368, 367; 343/753, 754

[56] References Cited

U.S. PATENT DOCUMENTS 3,979,755 9/1976 Sandoz et al. .......... 343/754

*Primary Examiner*—Mark Hellner

*Attorney, Agent, or Firm*—Sherry J. Whitney; Jennifer B. Wuamett

[57] ABSTRACT

A scanning array antenna (300) produces a directional beam by differentially rotating two, co-axial, flat phasing plate assemblies (302, 304). Each plate (302, 304) consists of a phase shifting means designed to efficiently pass incident radio frequency (RF) energy while imparting a particular phase shift to the energy. The energy can be supplied by a feedhorn (406) located behind the plates (402, 404) or can be introduced above the plates (508) and reflected by a ground plane (506) on the bottom plate (504). A method for producing the directional beam using the scanning array antenna (300) determines (804) the desired beam direction, calculates (806) the appropriate plate rotation angles (326, 328), and rotates (808) the plates (302, 304) at the appropriate time.

17 Claims, 4 Drawing Sheets

300

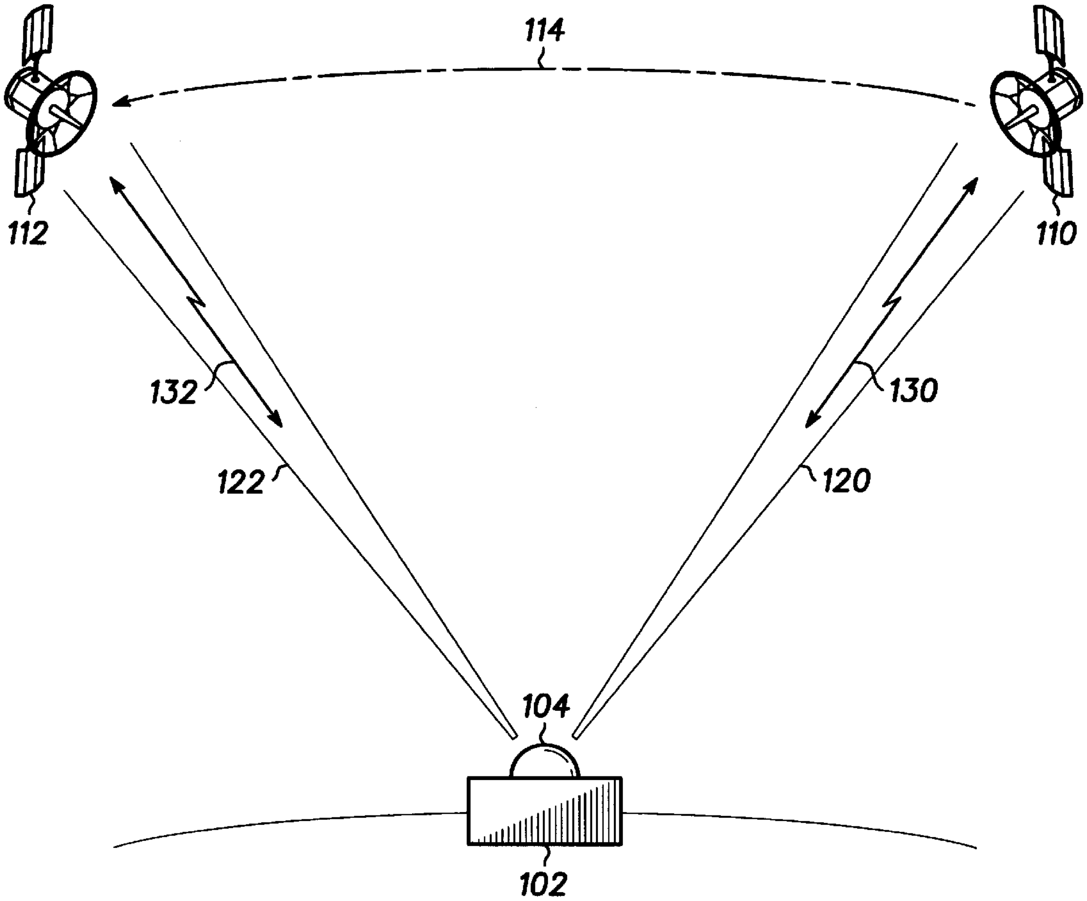
100 FIG. 1
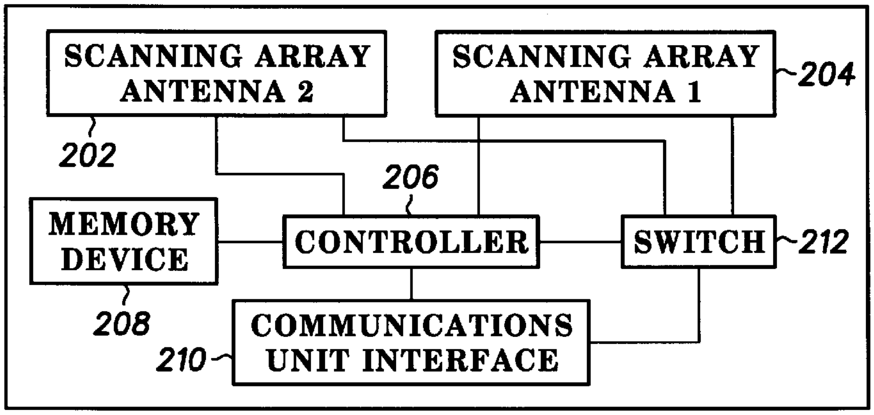
200 FIG. 2

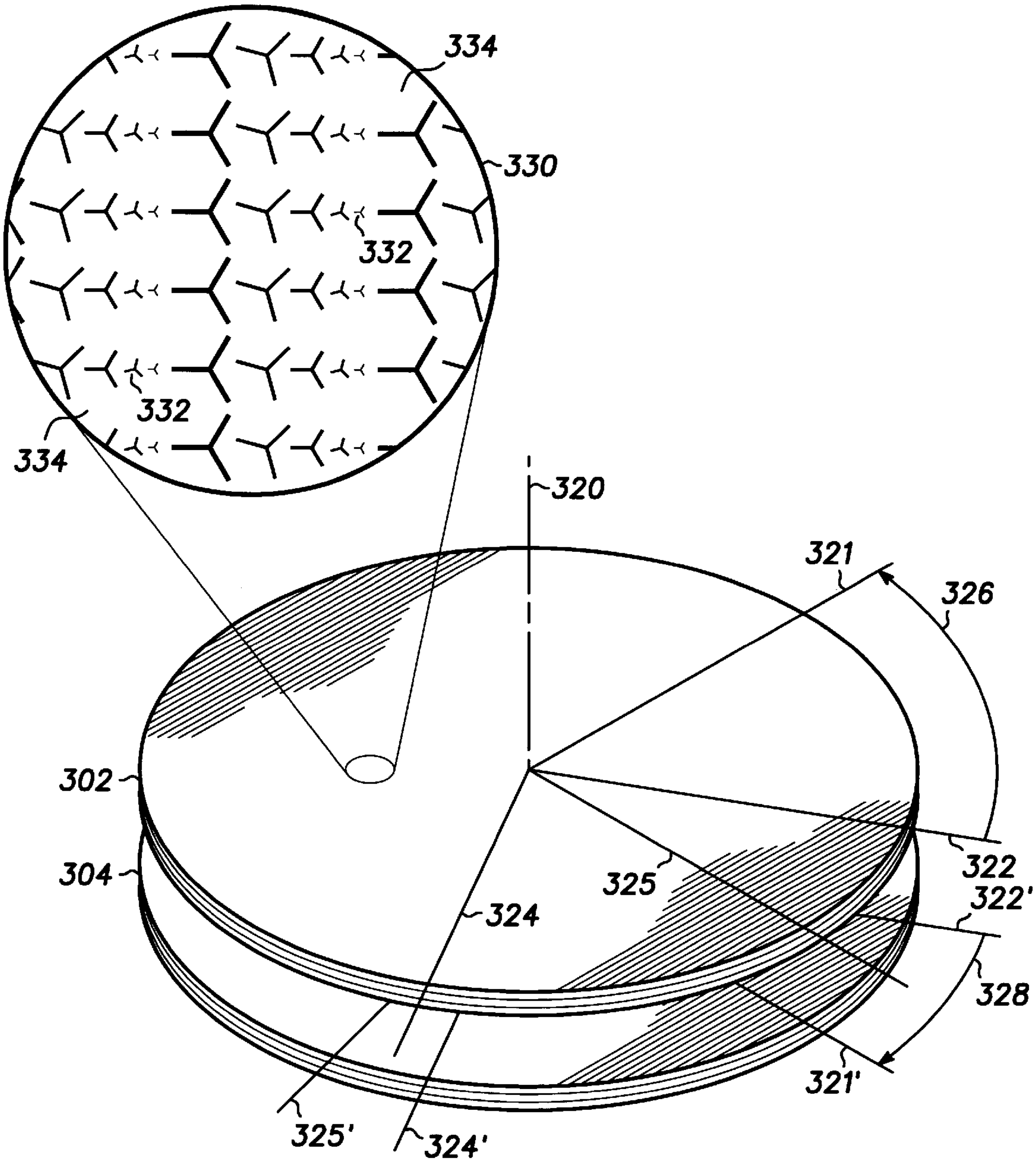
300 FIG. 3

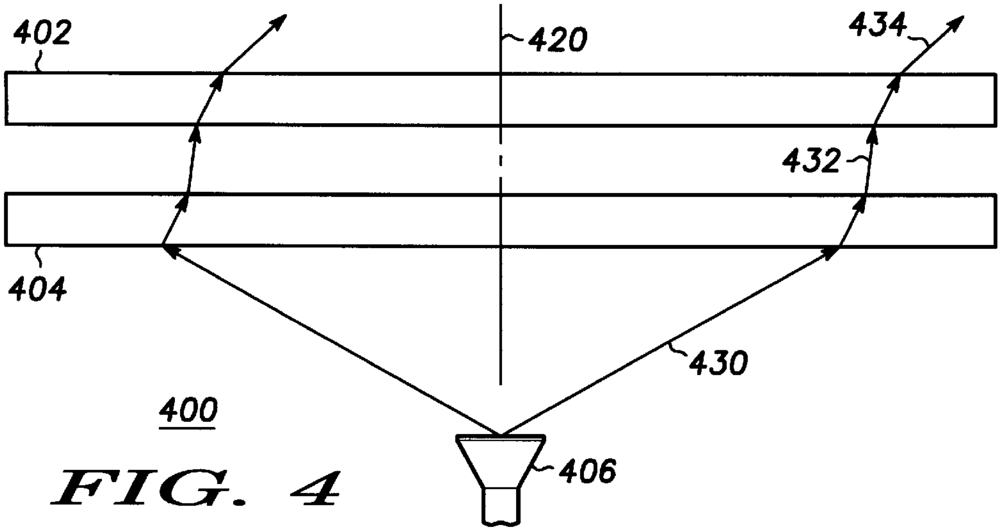
FIG. 4
FIG. 5
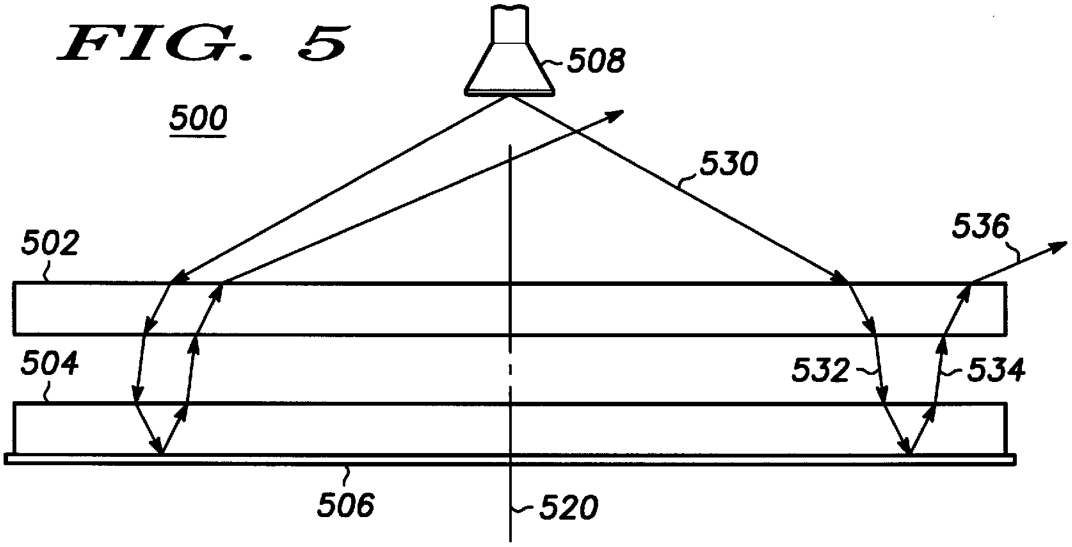
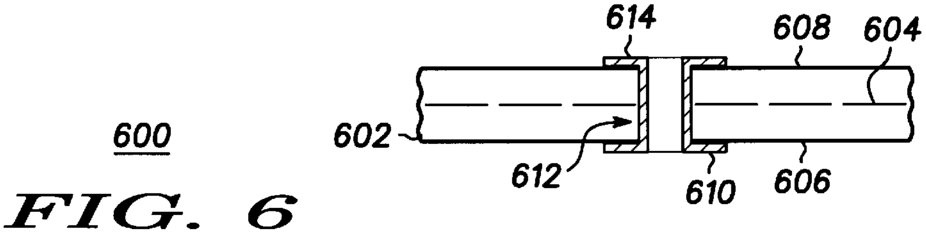
FIG. 6

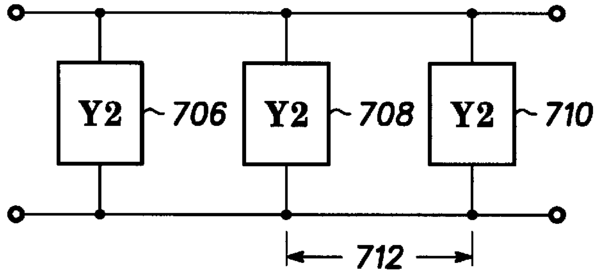
700 FIG. 7
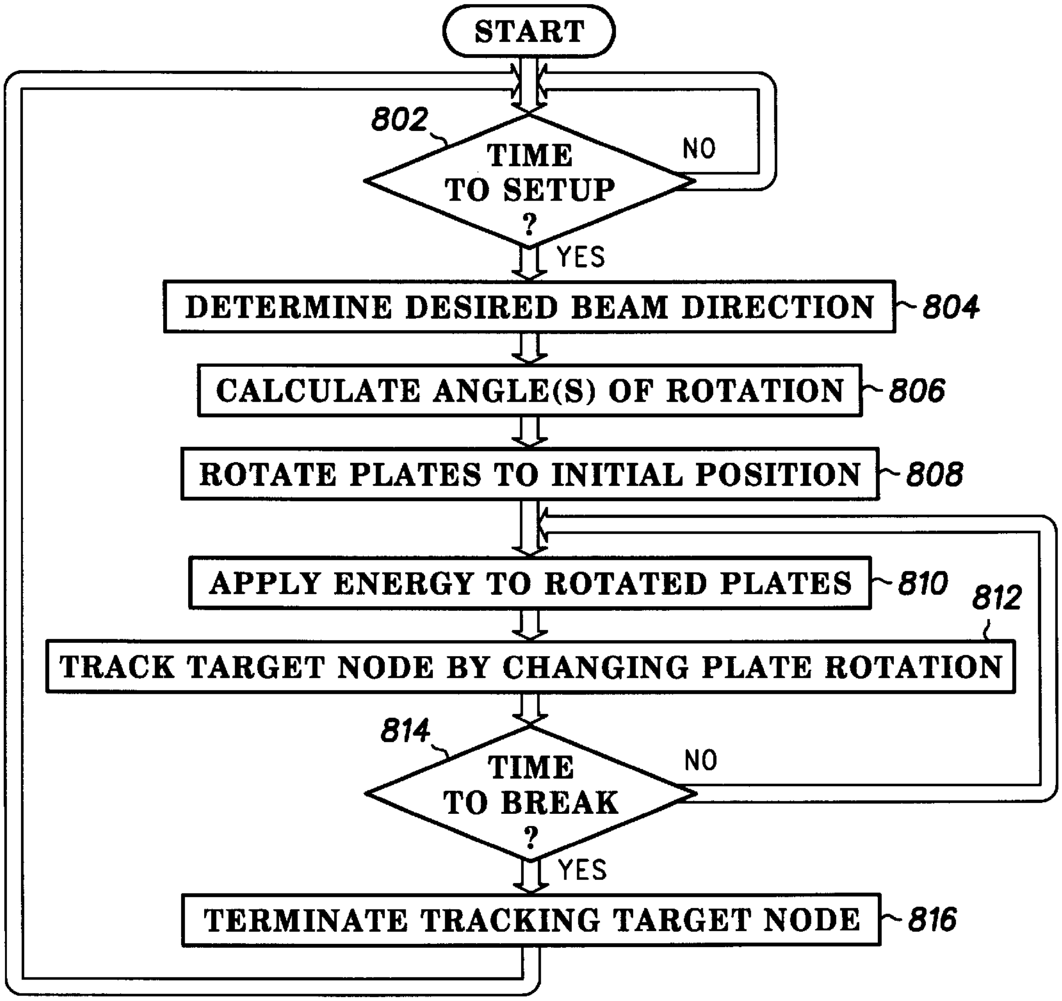
800 FIG. 8

SCANNING ARRAY ANTENNA USING ROTATING PLATES AND METHOD OF OPERATION THEREFOR

FIELD OF THE INVENTION

This invention relates generally to scanning array antennas and, more specifically, to scanning array antennas having mechanically rotatable sections.

BACKGROUND OF THE INVENTION

Antenna dishes are used by ground devices to communicate with satellite systems. For applications where the ground devices transmit signals to the satellites, these dishes provide narrow, high-gain beams which facilitate signal transmission through the earth's atmosphere.

Such antennas could be used in satellite communication systems using either geosynchronous (GEO) satellites or non-geosynchronous satellites, such as low-earth orbiting (LEO) satellites. LEO satellite orbits move with respect to the surface of the earth. Thus, if communications is to be maintained, an antenna dish which communicates with a LEO satellite would require a gimbal device to enable the dish to track the satellite movement.

A number of non-geosynchronous satellite networks have been proposed which would provide communications services to a large consumer base. In order to be viable in a competitive market, consumer devices which communicate with a non-geosynchronous network should be inexpensive and reliable. For home consumer use, it also is desirable to provide a consumer device which is relatively quiet and compact.

Gimbaled antennas are not an optimal solution for a consumer-based non-geosynchronous satellite system. These antennas typically are large, expensive, noisy, and not extremely reliable. Potentially adding to the expense and complexity of gimbaled antenna solutions is the fact that some non-geosynchronous systems could require make-before-break communication between the consumer device and the satellite network. In such systems, at least two satellite dishes and gimbal systems would be required to maintain communications. Thus, because of the complexity, reliability, and expense of gimbaled antenna systems, they do not provide an optimum solution for satellite-network consumer devices.

Electronically scanned phased array antennas have also been used in applications where a directional beam is desired. Electronic phased array antennas enable signals to be electrically steered without the necessity for mechanical gimbal devices. Unfortunately, electronically scanned array antennas which can be produced from current technology are extremely expensive, which means that such antennas would not be viable in the consumer market.

Because current technologies do not make steerable-beam antennas viable for commercial satellite communications applications, what is needed is a method and apparatus which provides an inexpensive, reliable, quiet, compact antenna to provide ground-to-satellite communication links within a non-geosynchronous satellite system.

BRIEF DESCRIPTION OF THE DRAWINGS

FIG. 1 illustrates a communication system in accordance with a preferred embodiment of the present invention;

FIG. 2 illustrates a simplified block diagram of a ground communication device in accordance with a preferred embodiment of the present invention;

FIG. 3 illustrates a two-plate scanning array antenna in accordance with a preferred embodiment of the present invention;

FIG. 4 illustrates a side view of a back fed scanning array antenna in accordance with an alternate embodiment of the present invention;

FIG. 5 illustrates a side view of a reflection scanning array antenna in accordance with an alternate embodiment of the present invention;

FIG. 6 illustrates a side view of a radiating element in accordance with a preferred embodiment of the present invention;

FIG. 7 illustrates a simplified representation of an equivalent circuit for a multi-layer printed circuit board in accordance with an alternate embodiment of the present invention; and FIG. 8 illustrates a flowchart of a method for a scanning array antenna to communicate with a target node in accordance with a preferred embodiment of the present invention.

DETAILED DESCRIPTION OF THE DRAWINGS

The method and apparatus of the present invention provides an inexpensive, reliable, quiet antenna and method for providing communication links between ground devices and target nodes (e.g., non-geosynchronous satellites) of a communication system. Particularly, the method and apparatus of the present invention provides a scanning array antenna which can be used to establish a beam between a ground device and a satellite. Further, the method and apparatus of the present invention enables the beam to track a non-geosynchronous satellite as it moves with respect to the antenna.

As will be described in detail below, the apparatus of a preferred embodiment of the present invention includes a scanning array antenna which produces a directional beam by differentially rotating two, co-axial, flat phasing plate assemblies. Each plate consists of a phasing means designed to efficiently pass incident, circularly-polarized, radio frequency (RF) energy while imparting a particular phase shift to the energy. The energy can be introduced by a feedhorn located behind the plates or can be introduced above the plates and reflected by a ground plane on the bottom plate. In alternate embodiments, the energy could be introduced by other signal-generation means.

In accordance with a preferred embodiment of the present invention, a method for producing the directional beam using the scanning array antenna determines the desired beam direction, calculates the appropriate plate rotation angles, and rotates the plates at the appropriate time. Although the method and apparatus of the present invention are described below for transmitter operations, by reciprocity, substantially the same scanning beam method and apparatus described can be applied when the energy flow is reversed (i.e., for receiver operations).

FIG. 1 illustrates communication system 100 in accordance with a preferred embodiment of the present invention. Communication system 100 includes ground device 102, steerable beam antenna 104, and satellites 110, 112. Ground device 102 communicates with the rest of communication system 100 through steerable beam antenna 104. Steerable beam antenna 104 provides at least one steerable beam which antenna 104 directs toward one or more target nodes (e.g., satellites 110, 112), and within which one-way, or bi-directional communication links 130, 132 are maintained.

Satellites 110, 112 could be geosynchronous (GEO) or non-geosynchronous satellites, such as, for example, low-earth orbit (LEO) satellites. To best illustrate the advantages of the method and apparatus of the present invention, satellites 110, 112 will be described as LEO satellites.

LEO satellites 110, 112 move with respect to the surface of the earth along orbital path 114. Because of this movement, scanning array antenna 104 must track the movement of a satellite 110, 112 in order to maintain communications with that satellite 110, 112. For example, as satellite 110 moves along orbital path 114, steerable beam antenna 104 must redirect beam 120 to follow the satellite movement.

Because LEO satellites 110, 112 move with respect to the surface of the earth, each satellite 110, 112 will experience periods of time when they are capable of communicating with ground device 102 and periods of time when they are incapable of communicating with ground device 102. For example, during a portion of its orbit, a LEO satellite 110, 112 will be below an angle of elevation with respect to ground device 102 at which communications are possible. In order to communicate with the satellite network, ground device 102 must maintain a link with a different satellite which is above the minimum angle of elevation. Communications links also could be degraded or interrupted where obstructions (e.g., trees, buildings, mountains) exist between ground device 102 and satellites 110, 112.

Because ground device 102 cannot maintain communications with a single LEO satellite throughout the satellite's entire orbit, ground device 102 must "hand off" communications from satellite to satellite as they rise above and drop below the ground device's minimum angle of elevation. Some communications systems employ a "make-after-break" handoff technique, where ground device 102 breaks its communication link with a first satellite (e.g., satellite 112) before making a communication link with a second satellite (e.g., satellite 110). In such a system, only a single antenna is necessary. After breaking the first link, the antenna is steered from the first satellite toward the second satellite, and the second link is then established.

Other communication systems employ a "make-before-break" handoff technique. Using this technique, ground device 102 would continue to track and communicate with the first satellite (e.g., satellite 112) while, at the same time, establishing a second link with the second satellite (e.g., satellite 110). The communication link with the first satellite would not be broken until after the second communication link is established. This enables continuous communications to be maintained between ground device 102 and the rest of the network. A make-before-break system requires ground device 102 to have at least two antennas. FIG. 1 illustrates a make-before-break system, where antenna 104 provides beams 120, 122 with both satellites 110, 112, thus enabling simultaneous communication links 130, 132 to be maintained.

FIG. 2 illustrates a simplified block diagram of ground communication device 200 in accordance with a preferred embodiment of the present invention. Ground communication device 200 includes scanning array antennas 202, 204, controller 206, switch 212, and communications unit interface 210. In a preferred embodiment, device 200 also includes memory device 208.

Scanning array antennas 202, 204 enable device 200 to communicate with one or more target nodes (e.g., satellites 110, 112, FIG. 1). Ground communication device 200 is shown to have two scanning array antennas 202, 204, which would enable device 200 to communicate simultaneously with two target nodes. Thus, ground communication device 200 could perform a make-before-break handoff between two target devices (e.g., between satellite 112 and satellite 110, FIG. 1). In alternate embodiments, device 200 could have more or fewer scanning array antennas, depending on how many simultaneous links device 200 is required to maintain.

Controller 206 desirably controls the operations of scanning array antennas 202, 204. In addition, controller 206 could control operation of switch 212, and could send and/or receive information from communication unit interface 210.

As will be described in more detail below, control of scanning array antennas 202, 204 includes causing each antenna's phasing plates to rotate with respect to each other, resulting in positioning of the steerable beam. Each antenna's phasing plates are rotated by a phasing plate rotation means (not shown) associated with scanning array antennas 202, 204. In a preferred embodiment, ground device 200 also includes a means (not shown) for tracking a target node which moves with respect to the scanning array antenna 202, 204. Tracking of a moving target node is performed by continuously adjusting the angles of rotation of the antennas phasing plates in order to produce a beam which follows the path of the target node.

In a preferred embodiment, controller 206 has knowledge of the relative location of each target node so that controller 206 can perform the calculations necessary to appropriately control phasing plate rotation. Location information can be stored, for example, in memory device 208. In an alternate embodiment, these calculations could be performed by another device and data necessary for controller 206 to control phasing plate rotation could be received from that other device.

Switch 212 sends data to and receives data from scanning array antennas 202, 204. Such data could originate from or be destined for communication unit interface 210, or such data could originate from or be destined for controller 206.

Communication unit interface 210 provides an interface between switch 212 (and scanning array antennas 202, 204) and any communication device which ground communication device 200 supports. For example, device 200 could enable communications between a satellite network and a home computer, facsimile machine, television, home security system, or other data source. In essence, communication unit interface 210 is the source of data transmitted by scanning array antennas 202, 204 and is the receiver of data received by scanning array antennas 202, 204.

In an alternate embodiment, more than one controller 206 could be used to control scanning array antennas 202, 204 and switch 212. In addition, more than one switch 212 could be used to interface between communications unit interface 210 and scanning array antennas 202, 204.

Although device 200 has been described as a "ground" communication device, it could be used in both fixed or mobile applications. In addition, device 200 could be used on airborne, spaceborne, seafaring, submarine, or other facilities or vehicles. In mobile applications, device 200 could compensate for the device's motion by employing a signal tracking mode or could use additional information describing the device's attitude and location in order to communicate with the target node.

FIG. 3 illustrates two-plate scanning array antenna 300 in accordance with a preferred embodiment of the present invention. Two-plate scanning array antenna 300 includes top plate 302 and bottom plate 304. In a preferred embodiment, plates 302, 304 (referred to herein as "phasing plates") are co-axially oriented, circular, substantially flat plates, each of which includes a multi-layer printed circuit board (PCB) or other phase shifting means. In a preferred embodiment, these phasing plates are desirably designed to efficiently pass incident RF energy without reflection while imparting a particular phase shift to the energy.

As will be described in more detail below in conjunction with FIG. 7, phasing plates could incorporate an admittance sheet having a pattern such as pattern 330, although any number of other patterns are possible.

In a preferred embodiment, the centers of plates 302, 304 are displaced slightly along z axis 320, around which plates 302, 304 rotate. In alternate embodiments, plates 302, 304 could rotate around an axis which does not extend through the centers of plates 302, 304.

Plates 302, 304 are oriented substantially parallel to each other. The top surface of plate 302 is shown to lie within a plane defined by x and y axes 322, 324, while the top surface of plate 304 is shown to lie within a plane defined by x and y 322' and 324'.

One or both plates 302, 304 are rotatable in order to provide a steerable beam as is described below. Assuming the relative transmission phase, P, through the plate for energy incident at any point x, y on the plate is given by Equation (Eqn.)1:

$$P(x,y)=x\delta \qquad \text{Eqn. 1}$$

where δ is a linear phase shifting constant for the plate having units of degrees per inch.

As will be described in more detail in conjunction with FIG. 7, this linear phase progression may be zoned (i.e., integer multiples of 360 degrees may be removed).

In FIG. 3, plate 302 is shown to have been rotated an angle 326 (ϕ) (counter-clockwise) and plate 304 is shown to have been rotated an angle 328 (−ϕ) (clockwise), so that the angle between the two plates is 2 ϕ. Let axis 321 and axis 325 represent the local coordinates x', y' of plate 302 and axis 321' and axis 325' represent the local coordinates x", y" of plate 304. With respect to the fixed coordinates x,y:

$$x'=x\cos\phi+y\sin\phi \qquad \text{Eqn. 2}$$

$$y'=-x\sin\phi+y\cos\phi \qquad \text{Eqn. 3}$$

$$x''=x\cos\phi-y\sin\phi \qquad \text{Eqn. 4}$$

$$y''=x\sin\phi+y\cos\phi \qquad \text{Eqn. 5}$$

The total phase, $P_{tOt}$, traversed through the two plates at any point x,y is given by:

$$P_{tOt}(x,y)=P_1(x',y')+P_2(x'',y'')=x'\phi+y''\phi \qquad \text{Eqn. 6}$$

By substituting Eqns. 2–5 into Eqn. 6 and simplifying, the total phase, $P_{tOt}$, becomes:

$$P_{tOt}(x,y)=(2\delta\cos\phi)x \qquad \text{Eqn. 7}$$

The differential rotation of plates 302, 304 results in a new linear phase shift, Δ, with total degrees per inch given by:

$$\Delta=2\delta\cos\phi \qquad \text{Eqn. 8}$$

By varying ϕ from 0 to 90 degrees, Δ will vary from 2δ to 0 degrees per inch. This corresponds to scanning the beam in the x-z plane from a maximum scan angle at $\theta=\theta_0$ to boradside scan angle at θ=0, where θ is the scan angle measured from z axis 320 (FIG. 3). The scan angle θ is related to the linear phase shift Δ by:

$$\Delta=-(360/\lambda)\sin\theta \qquad \text{Eqn. 9}$$

where λ represents wavelength.

Eqn. 1–9 illustrate how a beam is scanned in a single plane from broadside to $\theta_0$. The beam can be further scanned to any polar angle by rotating the two plates together while maintaining the relative angle between them. Thus, the beam can be scanned to any angle within a conical region by setting the rotation angle of the two plates.

Although Eqn. 1–9 are derived based on equal but opposite angles of rotation, ϕ and −ϕ, between plates 302, 304, respectively, similar equations could be derived where only one plate is rotated, or where both plates are rotated, but by unequal angles.

As described previously, energy is directed toward the scanning array antenna. In accordance with the method and apparatus of the present invention, the phasing plates each impart a phase shift to the energy, causing the energy to be steered in a particular direction. In a preferred embodiment of the present invention described in conjunction with FIG. 4, this energy is backfed to the scanning array antenna. In an alternate embodiment of the method and apparatus of the present invention described in conjunction with FIG. 5, this energy is fed through the top of the scanning array antenna and reflected back.

FIG. 4 illustrates a side view of back fed scanning array antenna 400 in accordance with an alternate embodiment of the present invention. Antenna 400 includes top plate 402, bottom plate 404, and feedhorn 406 located below bottom plate 404. Plates 402, 404 are substantially similar to plates 302, 304 shown and described in conjunction with in FIG. 3. In a preferred embodiment, plates 402, 404 are co-axial and rotatable around axis 420.

Feedhorn 406 directs energy signal 430 toward bottom plate 404. Bottom plate 404 imparts a first phase shift to energy signal 430, resulting in a phase change in the signal as indicated by phase shifted signal 432. Phase shifted signal 432 is then transmitted to top plate 402 which imparts a second phase shift, resulting in a phase change in the signal as indicated by additionally phase shifted signal 434. By rotating plates 402, 404 about axis 420, the cumulative phase shifts as given by Eqn. 8 enable the signal to be pointed in any direction within a conical area located above plate 402.

In one embodiment, feedhorn 406 is placed along axis 420, resulting in an unevenly-phased feedhorn signal being received at the bottom of plate 404. In a preferred embodiment, focus correction for the unevenly-phased feedhorn signal is built into one or both of plates 402, 404. The phase, $P_{feed}$, of the illumination on the bottom surface of plate 404 is given by:

$$P_{feed}=P_{feed}(r),\ \text{where}\ r^2=x^2+y^2 \qquad \text{Eqn. 10}$$

where r is the distance between feedhorn 406 and the bottom of plate 404 at a given point x,y.

In a preferred embodiment, each plate 402, 404 is modified using a focusing means which can be separate from or integrated with each plate 402, 404 so that its phase distribution is:

$$P(x,y)=x\delta-P_{feed}(r)/2 \qquad \text{Eqn. 11}$$

The term $P_{feed}$ on each plate does not change with rotation angle, so it can exactly cancel out the feed phase term from the feed radiation even as plates 402, 404 are rotated to scan the beam. As a result, there is no need for parabolic reflectors or lenses to illuminate the phase plates, and a simple, small feedhorn or other small feed antenna is adequate. In an alternate embodiment, only one of plates 402, 404 could be modified to provide focus correction. In other alternate embodiments, parabolic reflectors or lenses could be used to illuminate the phase plates to provide focus correction.

FIG. 5 illustrates a side view of reflection scanning array antenna 500 in accordance with an alternate embodiment of the present invention. Antenna 500 differs from antenna 400 shown in FIG. 4 in that antenna 500 is a reflection antenna, rather than an antenna whose energy source is located behind the phasing plates. Antenna 500 includes top plate 502, bottom plate 504, and feedhorn 508 located above top plate 502. Ground plane 506 is applied to the bottom surface of bottom plate 504.

Plates 502, 504 are substantially similar to plates 302, 304 shown and described in conjunction with in FIG. 3. In a preferred embodiment, plates 502, 504 are co-axial and rotatable around axis 520.

Feedhorn 508 directs energy signal 530 toward top plate 502. Top plate 502 imparts a first phase shift to energy signal 530, resulting in a phase change in the signal as indicated by phase shifted signal 532. Phase shifted signal 532 is then transmitted to bottom plate 504. Signal 532 passes through bottom plate 504, is reflected by ground plane 506, and again passes through bottom plate 504. This imparts a second phase shift which is approximately twice the phase shift that signal 532 would have received if it had passed through bottom plate 504 only a single time. The double pass through bottom plate 504 results in a phase change in the signal as indicated by additionally phase shifted signal 534. Signal 534 is then transmitted back to and passes through top plate 502, resulting in further phase shifted signal 536. By rotating plates 502, 504 about axis 520, the cumulative phase shifts enable the signal to be pointed in any direction within a conical area located above plate 502.

Because the signal passes through each plate 502, 504 twice, each plate 502, 504 need only impart half the desired phase shift during each pass through the plate. As a result, an advantage to the reflect array configuration shown in FIG. 5 is that plates 502, 504 may be thinner and have fewer layers. In addition, drive motors can be affixed to the bottom of ground plane 506 without interfering with the signal being transmitted or received.

As described in detail above, when feedhorn 508 is placed along axis 520, an unevenly-phased feedhorn signal is received at the top of plate 502. In a preferred embodiment, focus correction can be incorporated into one or both plates 502, 504 using a focusing means which can be separate from or integrated with plates 502, 504. In an alternate embodiment, only one of plates 502, 604 could be modified to provide focus correction. In other alternate embodiments, parabolic reflectors or lenses could be used to illuminate the phase plates to provide focus correction.

The apparatus of the present invention could use a number of phasing plate techniques. Two techniques are described in conjunction with FIGS. 6 and 7. FIG. 6 illustrates a phasing plate technique based on receiving, phase-shifting, and retransmitting a signal. FIG. 7 illustrates a phasing plate technique which uses an admittance sheet to impose phase shift to a signal.

FIG. 6 illustrates a side view of radiating element 600 in accordance with a preferred embodiment of the present invention. Radiating element 600 is disposed through phasing plate 602 which has top surface 608 and bottom surface 606 which are separated from each other by ground plane 604. Ground plane 604 is indicated by a dashed line to illustrate that multiple through holes could penetrate ground plane 604.

A signal is received at bottom radiating element 610 where it is partially phase shifted, and travels to top radiating element 614 via plated through hole 612, where the signal is further phase shifted and re-radiated by top element 614. In a preferred embodiment, a dense array of such elements is spaced at half wavelengths or less over the surface of phasing plate 602.

For example, a suitable radiating element for such a phasing plate 602 is a spiral antenna. Spiral antennas are circularly polarized and have wide fields of view. Phase shifting is accomplished in a spiral antenna by varying the number of turns in each spiral.

A radiating element similar to that described in conjunction with FIG. 6 could also be used to apply a phase shift to the bottom plate of a reflection array, such as bottom plate 504, FIG. 5. In such a case, the plated through holes (e.g., through hole 612, FIG. 6) would be shorted to the ground plane 506 affixed to the bottom of bottom plate 504.

In an alternate embodiment of the apparatus of the present invention, an admittance sheet is used in conjunction with the phasing plate to impose the phase shift to the signal. Such an implementation could, for example use a multi-layer printed circuit board (PCB). FIG. 7 illustrates a simplified representation of equivalent circuit 700 for a multi-layer PCB in accordance with an alternate embodiment of the present invention. In a preferred embodiment, multi-layer PCB has three or more layers.

Equivalent circuit 700 represents a multi-layer PCB in which the layers are desirably nominally separated by a quarter wavelength 712. Three layers are shown, although four or more layers may be more realistic for a practical implementation. By correctly selecting shunt admittances 706, 708, 710, a phase shift is imposed on the transmitted signal and the reflected signal is minimized. Admittances 706, 708, 710 are desirably differentially selected, enabling Eqn. 11 to be implemented.

A substantial amount of research has been performed with regard to the design of admittance plates. Referring again to FIG. 3, pattern 330 shows one such example, which is an array of copper tripole elements 332 oriented on substrate 334. Tripole elements 332 vary in orientation and size along one axis, but are consistent in orientation and size along a perpendicular axis. The sizes and size variations in tripole elements 332 are exaggerated in FIG. 3 for the purpose of illustration. This results in a differential phase shift occurring across the surface of plate 302. By differentially choosing the admittances across the surface of plate 302, Eqn. 11 may be implemented. Pattern 330 also illustrates the effect of zoning the phase shift (i.e., of removing integer multiples of 360 degrees so that the pattern appears to be periodic), which is done in a preferred embodiment.

A wide variety of patterns have been contemplated with regard to the design of admittance sheets, especially with regard to implementation of Frequency Selective Surfaces (FSS). Pattern 330 is shown by way of example, only, and is not intended to limit the scope of the apparatus of the present invention.

The scanning array antenna of the present invention can be used to provide a directional communication beam within a communication system such as that shown in FIG. 1.

FIG. 8 illustrates a flowchart of a method for a scanning array antenna (e.g., antenna 300, FIG. 3) to communicate with a target node (e.g., satellite 110, FIG. 1) in accordance with a preferred embodiment of the present invention. In a preferred embodiment, the steps illustrated in FIG. 8 are performed by a ground device (e.g., ground device 102, FIG. 1).

The method begins, in step 802, when it is determined that a time has come to setup a beam between the scanning array antenna and the target node. Such a time could occur, for example, when it becomes necessary to hand off from a first LEO satellite to a second LEO satellite due to the orientations and velocities of the satellites with respect to the ground device.

When it is time to setup a beam, a desired beam direction is determined in step 804. The beam direction depends on the orientation of the scanning array antenna and the position of the target node at the time when the beam will be established. Determination of the target node's position could be estimated, for example, from tables which include data describing the node's position with respect to time. Alternatively, a path propagation algorithm could be used to predict the node's position based on parameters describing the node's relative motion. For example, in a system using LEO satellites, the satellite's orbital parameters could be used to predict the satellite's future position.

After the desired beam direction is determined, angles of rotation of the phasing plates (e.g., phasing plates 302, 304, FIG. 3) are determined in step 806. These angles could be determined using equations such as Eqn. 7–9, for example. Other equations could also be used to determine the relative angles of rotation of the plates.

In step 808, the phasing plates are rotated into an initial position which will enable the antenna to direct a beam toward the target node at the appropriate time. The plates could be rotated together or one at a time in order to achieve the proper orientation.

At the time when it is appropriate to direct the beam toward the target node, energy is applied to the rotated phasing plates (e.g., via a feedhorn) in step 810. With extremely precise calculations, the resulting beam should encompass the transceiver of the target node. In some systems, it may be necessary to make relatively fine adjustments to the beam direction using a scanning technique. Such adjustments are made by further rotating the phasing plates.

In step 812, the target node is tracked by adjusting the angles of rotation of the phasing plates. Continuous angle adjustments enable a target node, such as a LEO satellite, to be tracked along its orbit until the satellite falls below the minimum angle of elevation for the scanning antenna.

In step 814, a determination is made whether it is time to break communications with the target node. If not, then steps 810 and 812 continue to be performed. If so, then tracking of the target node is discontinued, in step 816 and the procedure begins again as shown in FIG. 8.

Some steps in the method shown in FIG. 8 could be performed in different orders and/or in parallel with each other. For example, steps 804 and 806 could be performed for a next target node during execution of steps 808–816 for a current target node. In systems which employ multiple scanning array antennas within a particular ground device (e.g., ground device 200, FIG. 2), the method shown in FIG. 8 could be run simultaneously for multiple ones of the antennas.

In summary, the method and apparatus of the present invention include differentially rotating two, co-axial, flat phasing plate assemblies in order to produce a directional beam. The present invention has been described above with reference to preferred embodiments. However, those skilled in the art will recognize that changes and modifications may be made in these preferred embodiments without departing from the scope of the present invention. For example, the processes and stages identified herein may be categorized and organized differently than described herein while achieving equivalent results. In addition, although the method and apparatus of the present invention are described with respect to a LEO satellite network, they also could be applied within a GEO communication system, any other non-geosynchronous communication system, and any other communication system in which the use of a scanning array antenna is desired between two devices, whether or not such devices are fixed or moving with respect to each other. In addition, they also could be applied to any number of other applications, such as radar systems, which do not establish a link between two devices. These and other changes and modifications which are obvious to those skilled in the art are intended to be included within the scope of the present invention.

What is claimed is:

1. A scanning array antenna comprising:

a first phasing plate which imparts a first phase shift to energy directed toward the first phasing plate and which transmits phase shifted energy toward a second phasing plate; and the second phasing plate, mounted substantially in parallel to the first phasing plate, the second phasing plate imparting a second phase shift to the phase shifted energy, wherein the first phasing plate and the second phasing plate are rotatable by an angle of rotation with respect to each other, resulting in a beam having a direction which is related to the angle of rotation, the first phase shift, and the second phase shift, and wherein said beam is directed toward a node of a communication system to establish a link with said node.

2. The scanning array antenna as claimed in claim 1, wherein the first phasing plate includes a first printed circuit assembly which produces the first phase shift.

3. The scanning array antenna as claimed in claim 2, wherein the first printed circuit assembly includes an admittance sheet across which admittances are differentially chosen.

4. The scanning array antenna as claimed in claim 2, wherein the first printed circuit assembly includes at least three layers.

5. The scanning array antenna as claimed in claim 1, wherein the first phasing plate includes a number of radiating elements which produce the first phase shift.

6. The scanning array antenna as claimed in claim 1, further comprising:

a feedhorn oriented below the first phasing plate, wherein the feedhorn produces the energy directed toward the first phasing plate.

7. The scanning array antenna as claimed in claim 1, further comprising:

a ground plane affixed to a bottom surface of the second phasing plate; and a feedhorn oriented above the first phasing plate, wherein the feedhorn produces the energy directed toward the first phasing plate and the energy is reflected by the ground plane after the energy passes through the first phasing plate and the second phasing plate.

8. The scanning array antenna as claimed in claim 1, further comprising:

a focusing means for providing focus correction for an unevenly-phased feedhorn signal from a feedhorn which produces the energy directed toward the first phasing plate.

9. The scanning array antenna as claimed in claim 1, further comprising:

phasing plate rotation means for rotating the first phasing plate and the second phasing plate.

10. The scanning array antenna as claimed in claim 1, wherein the first phasing plate and the second phasing plate are substantially circular and are rotatable about a same axis which extends through centers of the first phasing plate and the second phasing plate.

11. A communication device comprising:

at least one scanning array antenna which includes a first phasing plate which imparts a first phase shift to energy directed toward the first phasing plate and which transmits phase shifted energy toward a second phasing plate, and the second phasing plate, mounted substantially in parallel to the first phasing plate, the second phasing plate imparting a second phase shift to the phase shifted energy, wherein the first phasing plate and the second phasing plate are rotatable by an angle of rotation with respect to each other, resulting in a beam having a direction which is related to the angle of rotation, the first phase shift, and the second phase shift;

a controller, coupled to the at least one scanning array antenna, wherein the controller is for controlling rotation of the first phasing plate and the second phasing plate by the angle of rotation; and wherein the at least one scanning array antenna directs the beam toward a satellite of a satellite communication network.

12. The communication device as claimed in claim 11, wherein the at least one scanning array antenna directs the beam toward a satellite of a satellite communication network.

13. The communication device as claimed in claim 11, further comprising:

means for tracking the satellite, coupled to the at least one scanning array antenna, wherein the means for tracking is for tracking the satellite as the satellite moves with respect to the scanning array antenna.

14. The communication device as claimed in claim 11, wherein the at least one scanning array antenna includes two or more scanning array antennas, wherein a first scanning array antenna maintains a first communication link with a first target node at least until a second scanning array antenna establishes a second communication link with a second target node.

15. A method for providing a directional beam between a communication device and a target node of a communication system comprising the steps of:

rotating a first phasing plate and a second phasing plate by an angle of rotation with respect to each other;

imparting, by the first phasing plate, a first phase shift to energy directed toward the first phasing plate, resulting in phase shifted energy;

imparting, by the second phasing plate which is mounted substantially in parallel to the first phasing plate, a second phase shift to the phase shifted energy, resulting in the directional beam having a direction which is related to the angle of rotation, the first phase shift, and the second phase shift; and directing said beam toward said target node of said communication system to establish a link with said target node.

16. The method as claimed in claim 15, further comprising the step of:

determining the direction of the directional beam from a location of the target node.

17. The method as claimed in claim 15, further comprising the step of:

continuously rotating the first phasing plate and the second phasing plate in order for the directional beam to track the target node as the target node moves with respect to the communication device.

* * * * *